(12) United States Patent
Hess et al.

(10) Patent No.: US 9,230,068 B2
(45) Date of Patent: Jan. 5, 2016

(54) METHOD AND SYSTEM FOR MANAGING LICENSE OBJECTS TO APPLICATIONS IN AN APPLICATION PLATFORM

(75) Inventors: Ron Hess, Monte Sereno, CA (US); Steven Tamm, San Francisco, CA (US); David Brooks, San Jose, CA (US); Amy Palke, Oakland, CA (US); Evan Moses, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 1391 days.

(21) Appl. No.: 11/866,898

(22) Filed: Oct. 3, 2007

(65) Prior Publication Data

US 2008/0209503 A1 Aug. 28, 2008

Related U.S. Application Data

(60) Provisional application No. 60/828,023, filed on Oct. 3, 2006.

(51) Int. Cl.
*G06F 21/00* (2013.01)
*G06F 21/10* (2013.01)
*G06F 9/445* (2006.01)
*G06Q 10/06* (2012.01)

(52) U.S. Cl.
CPC *G06F 21/10* (2013.01); *G06F 8/61* (2013.01); *G06Q 10/06* (2013.01)

(58) Field of Classification Search
USPC ................................. 705/59; 717/174, 176
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,403 A * | 2/1998 | Stefik | 705/44 |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |

(Continued)

OTHER PUBLICATIONS

International Search report mailed on Nov. 26, 2007, for PCT Application No. PCT/US06/35207 filed on Sep. 8, 2006, one page.

(Continued)

*Primary Examiner* — Tsan-Yu J Huang
(74) *Attorney, Agent, or Firm* — Zilka-Kotab, PC

(57) ABSTRACT

Systems and methods are provided for managing license objects to applications in an application platform database system. The method includes associating an LMA with an application installed to the application platform by a developer, notifying a license manager to which the license manager application is installed of the installation of the application to the application platform, and managing subscriber access to the application using the license manager application.

10 Claims, 16 Drawing Sheets

(56) References Cited

U.S. PATENT DOCUMENTS

| | | |
|---|---|---|
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,567,107 B1 | 5/2003 | Stannard |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,983,371 B1 * | 1/2006 | Hurtado et al. ............... 713/189 |
| 7,003,767 B2 * | 2/2006 | Larkin ........................ 717/172 |
| 7,062,502 B1 | 6/2006 | Kesler |
| 7,069,231 B1 | 6/2006 | Cinarkaya et al. |
| 7,069,293 B2 * | 6/2006 | Cox et al. .................... 709/203 |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,039 B2 | 8/2010 | Weissman et al. |
| 7,949,684 B2 | 5/2011 | Brooks et al. |
| 8,015,495 B2 | 9/2011 | Achacoso et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 8,457,545 B2 | 6/2013 | Chan |
| 8,484,111 B2 | 7/2013 | Frankland et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0133392 A1 | 9/2002 | Angel et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2002/0184618 A1 | 12/2002 | Bala et al. |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0107125 A1 | 6/2004 | Guheen et al. |
| 2004/0128001 A1 | 7/2004 | Levin et al. |
| 2004/0153416 A1 | 8/2004 | Fujimoto |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0267590 A1 | 12/2004 | Clark et al. |
| 2004/0268299 A1 | 12/2004 | Lei et al. |
| 2005/0049973 A1 | 3/2005 | Read et al. |
| 2005/0050555 A1 | 3/2005 | Exley et al. |
| 2005/0065925 A1 | 3/2005 | Weissman et al. |
| 2005/0091098 A1 | 4/2005 | Brodersen et al. |
| 2005/0223022 A1 | 10/2005 | Weissman et al. |
| 2006/0021019 A1 | 1/2006 | Hinton et al. |
| 2006/0021065 A1 * | 1/2006 | Kamperman et al. ......... 726/28 |
| 2006/0031547 A1 * | 2/2006 | Tsui et al. ................... 709/231 |
| 2006/0206834 A1 | 9/2006 | Fisher et al. |
| 2007/0038489 A1 * | 2/2007 | Kayahara et al. ................ 705/7 |
| 2007/0086741 A1 | 4/2007 | Ando et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0197287 A1 | 8/2011 | Hess et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2013/0218948 A1 | 8/2013 | Jakobson |

(56) References Cited

U.S. PATENT DOCUMENTS

| | | |
|---|---|---|
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |

OTHER PUBLICATIONS

U.S. Appl. No. 11/866,911, filed Oct. 3, 2007, for Lars Hofhansl et al.

Final Office Action from U.S. Appl. No. 13/016,941, dated Jun. 21, 2012.

Non-Final Office Action from U.S. Appl. No. 13/016,941, dated Mar. 9, 2012.

Advisory Action from U.S. Appl. No. 13/016,941, dated Sep. 26, 2012.

\* cited by examiner

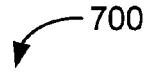

Package Object

Package is a custom object with the following fields: ◄──── 710

| | |
|---|---|
| Package Name | Text (80) (Name field) |
| Package ID | Text (18) |
| Developer Name | Text (80) |
| Developer Org ID | Text (18) |
| Release Date | Date |
| Latest Version | Text(20) |
| Lead Manager | Lookup (User) |

WSDL for package object: ◄──── 720

```
<complexType name="sfLma__Package__c">
<complexContent>
<extension base="ens:sObject">
<sequence>
<element name="CreatedBy" nillable="true" minOccurs="0" type="ens:User"/>
<element name="CreatedById" nillable="true" minOccurs="0" type="tns:ID"/>
<element name="CreatedDate" nillable="true" minOccurs="0" type="xsd:dateTime"/>
<element name="IsDeleted" nillable="true" minOccurs="0" type="xsd:boolean"/>
<element name="LastActivityDate" nillable="true" minOccurs="0" type="xsd:date"/>
<element name="LastModifiedBy" nillable="true" minOccurs="0" type="ens:User"/>
<element name="LastModifiedById" nillable="true" minOccurs="0" type="tns:ID"/>
<element name="LastModifiedDate" nillable="true" minOccurs="0" type="xsd:dateTime"/>
<element name="Name" nillable="true" minOccurs="0" type="xsd:string"/>
<element name="Owner" nillable="true" minOccurs="0" type="ens:Name"/>
<element name="OwnerId" nillable="true" minOccurs="0" type="tns:ID"/>
<element name="SystemModstamp" nillable="true" minOccurs="0" type="xsd:dateTime"/>
<element name="sfLma__Developer_Name__c" nillable="true" minOccurs="0" type="xsd:string"/>
<element name="sfLma__Developer_Org_ID__c" nillable="true" minOccurs="0" type="xsd:string"/>
<element name="sfLma__Latest_Version__c" nillable="true" minOccurs="0" type="xsd:string"/>
<element name="sfLma__Lead_Manager__c" nillable="true" minOccurs="0" type="tns:ID"/>
<element name="sfLma__Lead_Manager__r" nillable="true" minOccurs="0" type="ens:User"/>
<element name="sfLma__Package_ID__c" nillable="true" minOccurs="0" type="xsd:string"/>
<element name="sfLma__Release_Date__c" nillable="true" minOccurs="0" type="xsd:date"/>
</sequence>
</extension>
</complexContent>
</complexType>
```

Note the Package, License, Version object all count against the org limit.

FIG. 7

1.1.1 Package Version Object

This object is used to track versions of the packages  ← 810

| | |
|---|---|
| Package Version Name | Text(80) (Name field) |
| Package | Master-Detail |
| Version | Text (20) |
| Version ID | Text(18) |
| Release Date | Date |
| Sequence | Number |

WSDL for this object  ← 820

```
<complexType name="sfLma__Package_Version__c">
<complexContent>
<extension base="ens:sObject">
<sequence>
<element name="CreatedBy" nillable="true" minOccurs="0" type="ens:User"/>
<element name="CreatedById" nillable="true" minOccurs="0" type="tns:ID"/>
<element name="CreatedDate" nillable="true" minOccurs="0" type="xsd:dateTime"/>
<element name="IsDeleted" nillable="true" minOccurs="0" type="xsd:boolean"/>
<element name="LastModifiedBy" nillable="true" minOccurs="0" type="ens:User"/>
<element name="LastModifiedById" nillable="true" minOccurs="0" type="tns:ID"/>
<element name="LastModifiedDate" nillable="true" minOccurs="0" type="xsd:dateTime"/>
<element name="Name" nillable="true" minOccurs="0" type="xsd:string"/>
<element name="SystemModstamp" nillable="true" minOccurs="0" type="xsd:dateTime"/>
<element name="sfLma__Package__c" nillable="true" minOccurs="0" type="tns:ID"/>
<element name="sfLma__Package__r" nillable="true" minOccurs="0" type="ens:sfLma__Package__c"/>
<element name="sfLma__Release_Date__c" nillable="true" minOccurs="0" type="xsd:date"/>
<element name="sfLma__Sequence__c" nillable="true" minOccurs="0" type="xsd:double"/>
<element name="sfLma__Version__c" nillable="true" minOccurs="0" type="xsd:string"/>
<element name="sfLma__Version_ID__c" nillable="true" minOccurs="0" type="xsd:string"/>
</sequence>
</extension>
</complexContent>
</complexType>
```

*FIG. 8*

License Object

| | | |
|---|---|---|
| License Name | AutoNumber | ◄——— 1010 |
| Package Version | Lookup | |
| Lead | Lookup(Lead) | |
| License Status | Formula (based on RecordType) | |
| Install Date | Date | |
| Seats | Number(6,0) | |
| Licensed Seats | Formula (based on seats) | |
| Expiration | Date | |
| Expiration Date | Formula (based on expiration) | |
| Proxy User | Text(40) | |
| Account | Lookup | |
| Contact | Lookup | |

WSDL for license object :
```
<complexType name="sfLma__License__c">         ◄——— 1020
<complexContent>
<extension base="ens:sObject">
<sequence>
<element name="CreatedBy" nillable="true" minOccurs="0" type="ens:User"/>
<element name="CreatedById" nillable="true" minOccurs="0" type="tns:ID"/>
<element name="CreatedDate" nillable="true" minOccurs="0" type="xsd:dateTime"/>
<element name="IsDeleted" nillable="true" minOccurs="0" type="xsd:boolean"/>
<element name="LastModifiedBy" nillable="true" minOccurs="0" type="ens:User"/>
<element name="LastModifiedById" nillable="true" minOccurs="0" type="tns:ID"/>
<element name="LastModifiedDate" nillable="true" minOccurs="0" type="xsd:dateTime"/>
<element name="Name" nillable="true" minOccurs="0" type="xsd:string"/>
<element name="Owner" nillable="true" minOccurs="0" type="ens:Name"/>
<element name="OwnerId" nillable="true" minOccurs="0" type="tns:ID"/>
<element name="RecordType" nillable="true" minOccurs="0" type="ens:RecordType"/>
<element name="RecordTypeId" nillable="true" minOccurs="0" type="tns:ID"/>
<element name="SystemModstamp" nillable="true" minOccurs="0" type="xsd:dateTime"/>
<element name="sfLma__Account__c" nillable="true" minOccurs="0" type="tns:ID"/>
<element name="sfLma__Account__r" nillable="true" minOccurs="0" type="ens:Account"/>
<element name="sfLma__Contact__c" nillable="true" minOccurs="0" type="tns:ID"/>
<element name="sfLma__Contact__r" nillable="true" minOccurs="0" type="ens:Contact"/>
<element name="sfLma__Expiration_Date__c" nillable="true" minOccurs="0" type="xsd:string"/>
<element name="sfLma__Expiration__c" nillable="true" minOccurs="0" type="xsd:date"/>
<element name="sfLma__Install_Date__c" nillable="true" minOccurs="0" type="xsd:date"/>
<element name="sfLma__Lead__c" nillable="true" minOccurs="0" type="tns:ID"/>
```

*Fig. 10*

```xml
<element name="sfLma__Lead__r" nillable="true" minOccurs="0" type="ens:Lead"/>
<element name="sfLma__License_Status__c" nillable="true" minOccurs="0" type="xsd:string"/>
<element name="sfLma__Licensed_Seats__c" nillable="true" minOccurs="0" type="xsd:string"/>
<element name="sfLma__Package_Version__c" nillable="true" minOccurs="0" type="tns:ID"/>
<element name="sfLma__Package_Version__r" nillable="true" minOccurs="0" type="ens:sfLma__Package_Version__c"/>
<element name="sfLma__Proxy_User__c" nillable="true" minOccurs="0" type="xsd:string"/>
<element name="sfLma__Seats__c" nillable="true" minOccurs="0" type="xsd:double"/>
</sequence>
</extension>
</complexContent>
```

*Fig. 10 (cont'd)*

Listener Actions  1100

Package Version Upload ← 1110
1. Receive Message
2. Log into LMO
3. Add or update Package
    a. Check if package already exists
    b. If package does not exist
        i. Create package - fields:
            Name
            sfLma__Latest_Version__c
            sfLma__Release_Date__c
            sfLma__Package_ID__c
            sfLma__Developer_Org_ID__c
            sfLma__Developer_Name__c
    c. If package exists
        i. Select sfLma__Sequence__c from sfLma__Package_Version__c where Package_Version__c = existing package's sfLma__Latest_Version__c
        ii. If this sequence number > previous sequence number, update package – fields:
            Name
            sfLma__Latest_Version__c
            sfLma__Release_Date__c
    d. On error, nack message
4. Add Package Version
    a. Check if package version already exists and if it does not exist:
        i. Create package version - fields:
            Name
            sfLma__Version__c
            sfLma__Release_Date__c
            sfLma__Sequence__c
            sfLma__Package__c
    b. On error, nack message
5. If no error occurred, ack message

Licensed Package Install/Upgrade ← 1120
1. Receive Message
2. Log into LMO
3. Add or update Package ← 1122
    a. Check if package already exists
    b. If package does not exist
        i. Create package - fields:
            Name
            sfLma__Latest_Version__c
            sfLma__Release_Date__c
            sfLma__Package_ID__c

*Fig. 11* sfLma__Developer_Org_ID__c
sfLma__Developer_Name__c
   c. If package exists
      i. Select sfLma__Sequence__c from sfLma__Package_Version__c where Package_Version__c = existing package's sfLma__Latest_Version__c
      ii. If this sequence number > previous sequence number, update package – fields:
         Name
         sfLma__Latest_Version__c
         sfLma__Release_Date__c
   d. On error, nack message
4. Add Package Version   ◄—— 1124
   a. Check if package version already exists and if it does not exist
      i. Create package version - fields:
         Name
         sfLma__Version__c
         sfLma__Release_Date__c
         sfLma__Sequence__c
         sfLma__Package__c
   b. On error, nack message
5. Add or update License   ◄—— 1125
   a. Check if license already exists
   b. If license does not exist
      i. Select sfLma_Lead_Manager__c from Package
      ii. Create lead – fields:
         FirstName
         LastName
         Company
         Email
         sfLma__Subscriber_Org_Type__c
         LeadSource = "Package Installation"
         OwnerId = (id from lead manager query above)
         1. On error, gack, email somebody (alias to be provided by David Brooks), continue
      iii. Select Id from RecordType where SobjectType = 'sfLma__License__c' and Name = 'Active'
      iv. Create license - fields:
         sfLma__Package_Version__c
         RecordTypeId = (id found in RecordType query above)
         sfLma__Lead__c = (id from lead create above)
         sfLma__Install_Date__c
         sfLma__Seats__c = -1
         sfLma__Expiration__c = 01/01/1970
         1. On error, nack
   c. If license does exist
      i. Update license – fields:

*Fig. 11 (cont'd)* sfLma__Package_Version__c
RecordTypeId = (id found in RecordType query above)
    ii. On error, nack message
6. If no error occurred, ack message

Licensed Package Uninstall ◄──── 1140
1. Receive Message
2. Log into LMO ◄──── 1143
3. Add or update Package
   a. Check if package already exists
   b. If package does not exist
      i. Create package - fields:
         Name
         sfLma__Latest_Version__c
         sfLma__Release_Date__c
         sfLma__Package_ID__c
         sfLma__Developer_Org_ID__c
         sfLma__Developer_Name__c
   c. If package exists
      i. Select sfLma__Sequence__c from sfLma__Package_Version__c where Package_Version__c = existing package's sfLma__Latest_Version__c
      ii. If this sequence number > previous sequence number, update package – fields:
         Name
         sfLma__Latest_Version__c
         sfLma__Release_Date__c
   d. On error, nack message
4. Add Package Version ◄──── 1144
   a. Check if package version already exists and if it does not exist
      i. Create package version - fields:
         Name
         sfLma__Version__c
         sfLma__Release_Date__c
         sfLma__Sequence__c
         sfLma__Package__c
   b. On error, nack message
5. Update License ◄──── 1145
   a. Check if license already exists and if it does exist
      i. Select Id from RecordType where SobjectType = 'sfLma__License__c' and Name = 'Uninstalled'
      ii. Update license – fields:
         sfLma__Package_Version__c
         RecordTypeId = (id found in RecordType query above)
      iii. On error, nack message
6. If no error occurred, ack message

*Fig. 11 (cont'd)*

Package Install/Upgrade   ◄——1150
1. Receive Message
2. Update Import.InstallDate__c in Tz org
   a. On error, nack message
3. If no error occurred, ack message

Package Uninstall   ◄——1160
1. Receive Message
2. Update Import. UninstallDate __c in Tz org
   a. On error, nack message
3. If no error occurred, ack message

Install Failure   ◄—— 1170
1. Receive Message
2. Update Import, InstallFailure__c in Tz org
   a. On error, nack message
3. If no error occurred, ack message

*Fig. 11 (cont'd)*

METHOD AND SYSTEM FOR MANAGING LICENSE OBJECTS TO APPLICATIONS IN AN APPLICATION PLATFORM

CROSS-REFERENCES TO RELATED APPLICATIONS

This application claims the benefit of U.S. Provisional Application Ser. No. 60/828,023, the entire disclosure of which is incorporated by reference for all purposes.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

The present invention relates generally to database systems, and more particularly to systems and methods for managing license objects to applications in an application platform.

Previous systems and methods have been developed for managing custom objects to applications in an application platform that associates data from a computer database. Computer databases, however, are plagued by numerous problems in general. Each organization, business, or agency, installs its own copy of the database. It was not long, however, before users wished to add their own custom objects and applications to their database in addition to the standard objects and standard applications already provided.

The desire for customization lead to disparate schema, an organization of the types of information being stored in the database, as well as applications relying upon that schema being implemented by different users. Disparate schema, in turn blocked any hope of users in different organizations of sharing information or applications among one another. As a result, systems, mechanisms and methods of creating, exporting, viewing and testing, and importing custom applications in a multi-tenant environment were subsequently provided.

In a multi-tenant application platform, subscribers wish to download and license customized applications from a partner organization wherein the customized applications have been created by third party developers updating standard database objects and applications with new features. However, licensors of the database objects and applications need to manage and audit such use according to a predetermined user defined set of workflow rules. For example, if a subscriber wishes to purchase ten user seat licenses of a particular application, the licensor would like to monitor or prohibit any use in excess of the contracted limits. Existing systems in such a multi-tenant application platform provide manual means of enforcement for such licensing paradigms, leading to expensive intellectual property enforcement.

A new method and system for managing notification to a licensor of both custom and standard applications in a multi-tenant platform environment is therefore needed. A method and system of providing such notification of a licensor by modifying a license object and creating a license manager automated application is further needed.

BRIEF SUMMARY

Systems and methods are provided by embodiments for managing license objects to applications in an application platform. One method embodiment typically includes associating a license manager application ("LMA") with an application installed to the application platform by a developer, notifying a license manager to which the license manager application is installed of the installation of the application to the application platform, and managing subscriber access to the application using the license manager application.

One embodiment provides a method for managing license objects to applications in an application platform that includes performing a verification process to determine if a manifest violates a set of provider controlled rules. A version control step in an LMA may be validated to determine whether a user selected version is an upgrade or an extension and managing necessary prerequisite package installations. A license object may be associated with a user and a package. The license package may be installed and associated with an LMA such that an application installed to the application platform by a developer and downloaded by a subscriber matches the license on either a per package basis or on a per object basis. A set of provider defined rules may be applied to those packages that are managed.

Another embodiment provides a method for managing license objects to applications in a multi-tenant application platform that includes installing a license manager organization ("LMO") to obtain a proxy user in a partner organization. The proxy user has authority to disable the package and appears to the subscriber as editing a record in a multi-tenant application platform. An object edit step allows the proxy user to edit package objects, version objects, and licensee objects in a database schema wherein the proxy user determines status changes as either active or disabled and implements notification of a new or upgraded version of a custom application being uploaded to the application services platform application exchange. Another aspect of object editing is directed to licensee objects wherein the licensee objects comprise license properties including package version, license status, install date, the number of seats, formula for the number of seats, expiration date and formula, the proxy user, account and contact information. In a replication step, all license property, package and version objects are updated across the subscriber instance of the multi-tenant application platform in the network when a package is installed. In a separate aspect of the replication step, all updates of the subscriber instance are associated with the multi-tenant application platform across multiple time zones during a replication of the database schema. In another aspect of the replication step, the replication is performed asynchronously to achieve schema updates when a subscriber organization instance is offline for maintenance.

Another embodiment provides a computer readable medium that implements a method for managing license objects to applications in a multi-tenant application platform. One embodiment includes a program code for associating an LMA with an application installed to the application platform by a developer. Another aspect of the application provides program code for notifying a license manager to which the license manager application is installed of the installation of the application to the application platform. An additional aspect of the application provides program code for managing subscriber access to the application using the license manager application.

A further embodiment includes a method for providing a bootstrap sequence when a license management application is created to install into the LMO. Initially, an LMA is created and associated with an LMO in a host developer organization. The initial step is next verified by making a check call to the organization to make sure that it has the LMA already installed. Once the LMO has the LMA installed, the host developer uploads the LMA into the application exchange directory. The next step in the bootstrap sequence determines if the package exists when an LMA is downloaded into the LMO. If it does not exist, a message servers creates the package. The message server creates the package by downloading an LMA associated with the LMO and creating a package license in the LMO. Once the package is associated with both the LMA and LMO, an installation sequence is executed to complete the bootstrap sequence.

In another embodiment, a method is provided for managing license objects to applications in a multi-tenant application platform. The method includes installing an LMO to obtain a proxy user in a partner organization. The proxy user has authority to disable the package and appears to the subscriber as editing a record in a multi-tenant application platform. The proxy user may be provided with the capability to edit package objects, version objects, and licensee objects in a database schema. Further, the proxy user has the ability to track three messages including a version upload, a package installation upgrade, and a package uninstallation. During a package uninstallation tracking step, a message is sent to the LMO and the status of the license object is changes to uninstalled. The proxy user determines status changes as in either an active or disabled mode and implements notification of a new or upgraded version of a custom application being uploaded to the application services platform, application exchange. The licensee objects may include license properties, such as for example and without limitation, package version, license status, install date, the number of seats, formula for the number of seats, expiration date and formula, the proxy user, account and contact information. License properties, package and version object updates may be replicated across the subscriber instance of the multi-tenant application platform in the network when a package is installed, upgraded or uninstalled in a cross instance, two phase commit process aspect of the embodiment. To implement the cross instance, two phase commit process, a record displayed is verified to belong in the database table to gain access to the package update data for the subscriber instance. In another aspect of the embodiment, updates of the subscriber instance associated with the multi-tenant application platform may be replicated across multiple time zones. Further, asynchronous replications may be performed to update a subscriber organization instance when the subscriber organization instance is offline for maintenance or the like. A similar, analogous procedure is implemented to uninstall a package, upload a version update, and install a package upgrade using the two phase commit, cross instance aspect of the embodiment.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

FIG. 7 illustrates a code sequence of a package object in an embodiment.

FIG. 8 illustrates a code sequence of a package version object in an embodiment.

FIG. 10 illustrates an embodiment of a code sequence of a license object in an embodiment.

FIG. 11 illustrates embodiments of code sequences of listener actions in an embodiment.

DETAILED DESCRIPTION OF THE INVENTION

The present invention provides systems and methods for managing license objects to applications in an application platform. The systems and methods are particularly useful in an on-demand database service. System, mechanism and method embodiments can provide the ability to associate a subscriber license with a customized version of an application installed to the application platform by a developer. A subscriber license is a license permitting a subscriber to use an application installed to the platform. Further, some system and method embodiments can notify a licensor of a standard object when a third party had customized the application. A standard object is a member of a set of objects included with an instance of an on-demand service at initiation of the service. Some embodiments can further provide a tracking mechanism to determine when a subscriber exceeds a contracted number of users of both the customized application and standard application. These and other benefits may be realized by proper practice of the described embodiments.

System Overview

Figure 1:
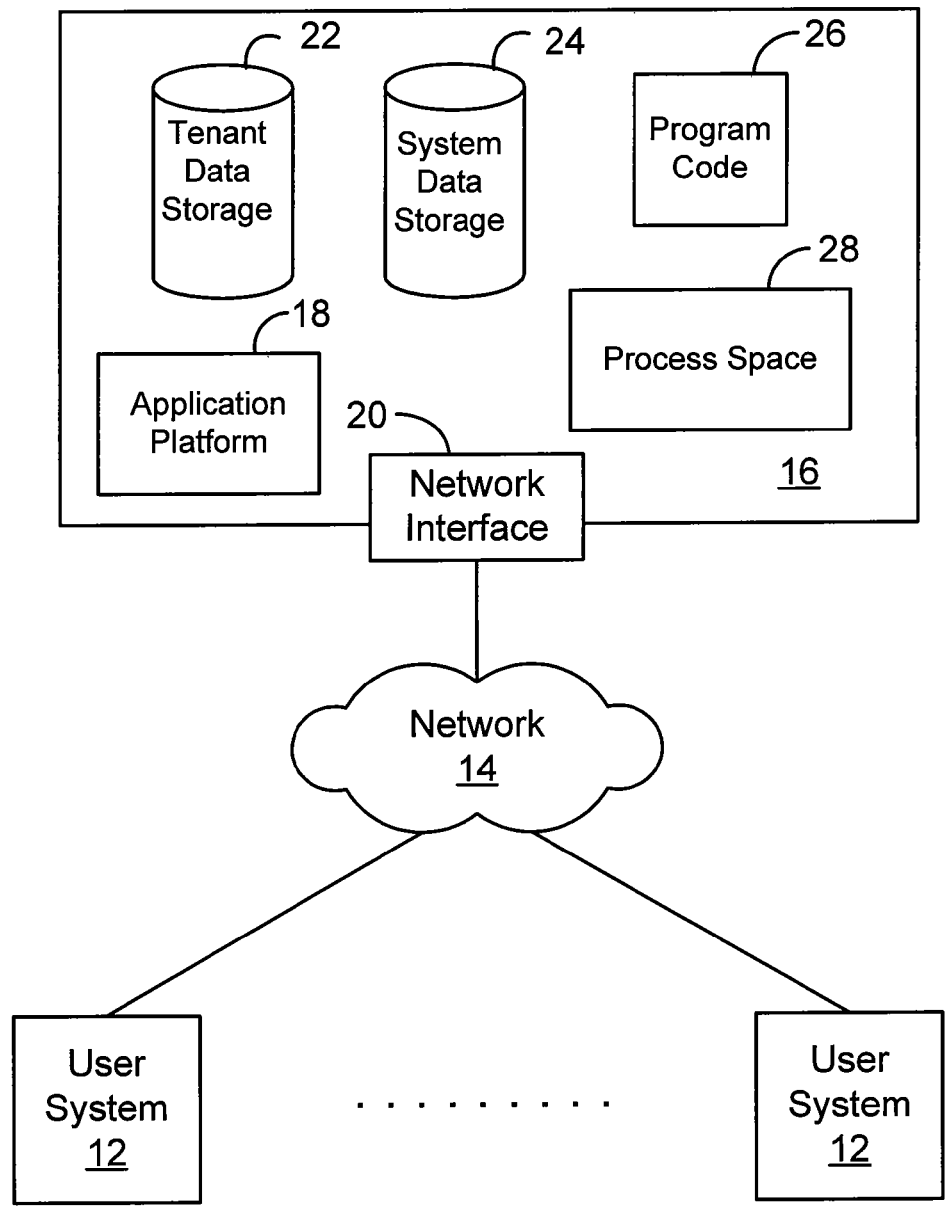
FIG. 1 illustrates an environment wherein an on-demand database service might be used.

FIG. 1 illustrates an environment wherein an on-demand database service might be used. As illustrated in FIG. 1 (and in more detail in FIG. 2) user systems 12 might interact via a network 14 with an on-demand database service 16. Some on-demand database services may store information from one or more tenants stored into tables of a common database image to form a multi-tenant database system (MTS). Accordingly, on-demand database service 16 and system 16 will be used interchangeably herein. A database image may include one or more database objects. A relational database management system (RDMS), object oriented database management system (OODBMS) or the like may execute storage and retrieval of information against the database object(s). Some on-demand database services may include an application platform 18 that enables creation, managing and executing one or more applications developed by the provider of the on-demand database service, users accessing the on-demand database service via user system 12, or third party application developers accessing the on-demand database service via user system 12.

The users of one or more of user system 12 might be users in differing capacities, and the capacity of a particular user system 12 might be entirely determined by permissions (permission levels) for the current user. For example, where a salesperson is using a particular user system 12 to interact with System 16, that user system has the capacities allotted to that salesperson. However, while an administrator is using that user system to interact with System 16, that user system has the capacities allotted to that administrator. In systems with an hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 can be a LAN (local area network), WAN (wide area network), wireless network, point-to-point network, star network, token ring network, hub network, or other appropriate configuration. As the most common type of network in current use is a TCP/IP (Transfer Control Protocol and Internet Protocol) network such as the global internetwork of networks often referred to as the "Internet" with a capital "I," that will be used in many of the examples herein. However, it should be understood that the networks that the present invention might use are not so limited, although TCP/IP is a frequently implemented protocol.

User system 12 might communicate with System 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at System 16. Such HTTP server might be implemented as the sole network interface between System 16 and network 14, but other techniques might be used as well or instead. In some implementations, the interface between System 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations are contemplated.

In one embodiment, the system shown in FIG. 1 implements a web-based customer relationship management (CRM) system. For example, in one embodiment, System 16 includes application servers configured to implement and execute CRM software applications as well as provide related data, code, forms, Web pages and other information to and from user systems 12 and to store to, and retrieve from, a database system related data, objects and Web page content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of System 16 is shown in FIG. 1, including a network interface 20, application platform 18, storage 22 for tenant data, storage 24 for system data accessible to System 16 and possibly multiple tenants, program code 26 for implementing various functions of System 16, and a process space 28 for executing MTS system processes and tenant-specific processes, such as running applications as part of an application hosting service. Additional processes that may execute on System 16 include database indexing processes.

Several elements in the system shown in FIG. 1 include conventional, well-known elements that need not be explained in detail here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from System 16 over network 14. Each user system 12 also typically includes one or more user interface devices, such as a keyboard, a mouse, touch screen, pen or the like, for interacting with a graphical user interface (GUI) provided by the browser on a display (e.g., monitor screen, LCD display, etc.) in conjunction with pages, forms, applications and other information provided by System 16 or other systems or servers. For example, the user interface device can be used to access data and applications hosted by System 16, and to perform searches on stored data, and otherwise allow a user to interact with various GUI pages that may be presented to a user.

As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, System 16 (and additional instances of an MTS, where more than one is present) and all of their components might be operator configurable using application(s) including computer code run using a central processing unit such as an Intel Pentium® processor or the like, or multiple processor units. A computer program product embodiment includes a machine-readable storage medium (media) having instructions stored thereon/in which can be used to program a computer to perform any of the processes of the embodiments described herein. Computer code for operating and configuring System 16 to intercommunicate and to process web pages, applications and other data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, in C, C++, HTML, any other markup language, Java™, JavaScript, ActiveX, any other scripting language such as VBScript, and many other programming languages as are well known. (Java™ is a trademark of Sun Microsystems, Inc.).

According to one embodiment, each System 16 is configured to provide web pages, forms, applications, data and media content to user (client) system 12 to support the access by user system 12 as tenants of System 16. As such, System 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
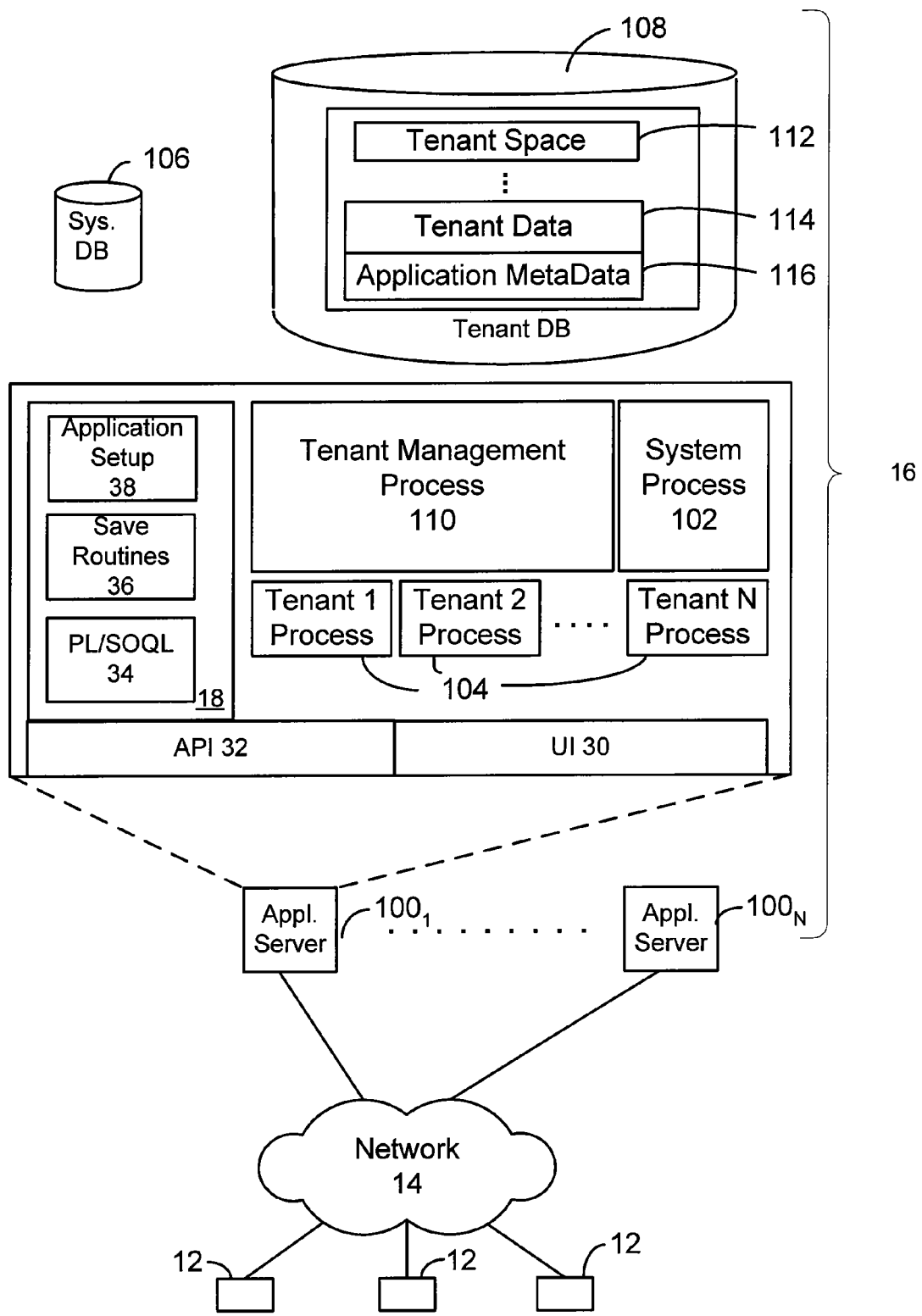
FIG. 2 illustrates elements of an example system 16 and various interconnections in an embodiment.

FIG. 2 illustrates elements of an example System 16 and various interconnections in an embodiment. As shown by FIG. 2, example System 16 includes a network interface 20 (of FIG. 1) implemented as one or more HTTP application servers 100, an application platform 18 and database objects 106, 108. Also shown is system process space 102, including individual tenant process spaces 104, a tenant management process space 110 and database objects 106, 108. A Tenant database 108 might be divided into individual tenant storage areas 112, which can be either a physical arrangement or a logical arrangement. Within each tenant storage area 112, user storage 114 and application storage 116 might similarly be allocated for each user. For example, a copy of a user's most recently used (MRU) items might be stored to user storage area 114. Similarly, a copy of MRU items for an entire organization that is a tenant might be stored to tenant storage area 112. A user interface UI 30 provides a user interface and an API 32 provides an application programmer interface to System 16 resident processes to users and/or developers at user systems 12.

Application platform 18 includes an application setup mechanism 38 that supports application developers' creation and management of applications, which may be saved as metadata into tenant database 108 by save routines 36 for execution by subscribers as one or more tenant processes 104 managed by tenant management process 110 for example. Invocations to such applications may be coded using PL/SOQL 34 that provides a programming language style interface extension to API 32. Invocations to applications may be detected by one or more system processes, which manages retrieving application metadata 116 for the subscriber making the invocation and executing the metadata as an application in a virtual machine.

It should also be understood that each application server 100 may be communicably coupled to database systems, e.g., system database 106 and tenant database(s) 108, via a different network connection. For example, one server $100_1$ might be coupled via the Internet 14, another server $100_{N-1}$ might be coupled via a direct network link, and another server 100N might be coupled by yet a different network connection. Transfer Control Protocol and Internet Protocol (TCP/IP) are typical protocols for communicating between servers 100 and the database system; however, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the servers 100 and the user systems 12 to distribute requests to the servers 100. In one embodiment, the load balancer uses a least connections algorithm to route user requests to the servers 100. Other examples of load balancing algorithms, such as round robin and observed response time, also can be used. For example, in certain embodiments, three consecutive requests from the same user could hit three different servers 100, and three requests from different users could hit the same server 100. In this manner, System 16 is multi-tenant, wherein System 16 handles storage of, and access to, different objects, data and applications across disparate users and organization.

As an example of storage, one tenant might be a company that employs a sales force where each salesperson uses System 16 to manage their sales process. Thus, a user might maintain contact data, leads data, customer follow-up data, performance data, goals and progress data, etc., all applicable to that user's personal sales process (e.g., in tenant database 108). In an example MTS arrangement, since all of this data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by System 16 that are allocated at the tenant level while other data structures might be managed at the user level. Because an MTS might support multiple tenants including possible competitors, the MTS should have security protocols that keep data, applications, and application use separate. Also, because many tenants will opt for access to an MTS rather than maintain their own system, redundancy, up-time, and backup are additional critical functions and need to be implemented in the MTS.

In addition to user-specific data and tenant-specific data, System 16 might also maintain system level data usable by multiple tenants or other data. Such system level data might include industry reports, news, postings, and the like that are sharable among tenants.

In certain embodiments, client system 12 communicate with application servers 100 to request and update system-level and tenant-level data from System 16 that may require one or more queries to database system 106 and/or database system 108. System 16 (e.g., an application server 100 in System 16) automatically generates one or more SQL statements (the SQL query) designed to access the desired information. Database system 108 may generate query plans to access the requested data from the database.

Each database can generally be viewed as a collection of objects, such as a set of logical tables, containing data fitted into predefined categories. A "table" is one representation of a data object, and is used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead and Opportunity data, each containing pre-defined fields. It should be understood that "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Managing License Objects

Figure 3:
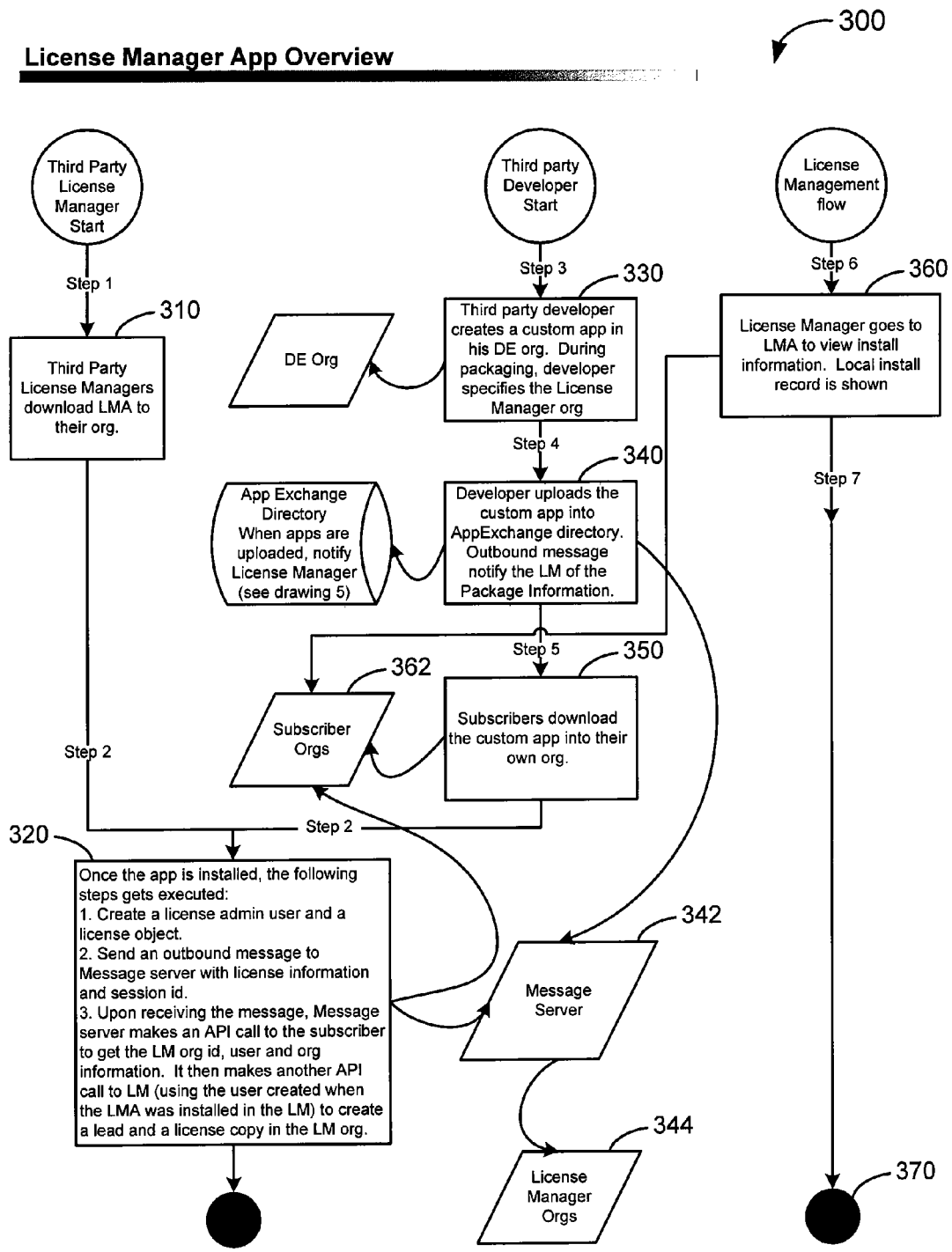
FIG. 3 illustrates an overview flow diagram of an embodiment.

According to one embodiment as illustrated in FIG. 3, a method 300 is provided for managing license objects associated with applications in an application platform. In an embodiment, a license is associated with a custom object that has a lookup relationship with a package. As used herein, a "package" is a metadata object that references the set of metadata objects used in an application in an organization. The package can include an application installable to the organization. Packages can be either managed or unmanaged. A managed package includes control elements enforcing versioning, customization of the package metadata. An unmanaged package is one that, lacking these control elements, cannot be as easily upgraded, while a managed package is an application package that can be upgraded by the installing organization. In an embodiment, an application includes a group or package of multi-tenant database setup data (e.g. metadata) that defines its data model, user interface and business logic.

As used herein, the term "organization" can mean a single tenant in a multi-tenant system and/or a set of metadata (both application data and metadata) for a single tenant in a multi-tenant system. An organization may be associated with an LMO and a Subscriber to create an instance of the disclosed method and system. A license object includes various properties such as package version, license status, install date, the number of seats, formula for the number of seats, expiration date and formula, a proxy user, account and contact information and other such pertinent information depending upon the embodiment. An example of a license object and associated fields implemented in one embodiment is further described and illustrated in FIG. 10.

The method 300 typically includes associating an LMA with an application and correspondingly downloading a custom application that has been created and uploaded to an application exchange by a third party developer. In an embodiment, a license manager implements the process of method 300 and views install information from subscribers. In block 310, a third party license manager may download an LMA to its organization. In block 320, an application installation sequence is executed to create a lead and a license copy in the LMO.

In block 330, a third party developer may create a custom application in the developer partner organization. During packaging, the developer specifies the LMO that is associated with the package. In block 340, the developer may upload the custom application into the application exchange directory. An outbound message may then notify the license manager of the package information. The subscriber instance of the downloaded package may be asynchronously updated to all linked database schema via a two phase commit process and updated to the host organization database schema. Updates can include status changes in object and field attributes that define whether that field or object can be altered. For example, an "immutable" field may not be able to be altered by anyone. The source user can set an immutable flag so that nobody is able to modify the field or object after it has been packaged and published. An upgrade process that executes checks on each of such fields, where present, determines the extent that customizations are maintained upon upgrades and on updates. Updates may also include the various properties from the license as discussed above.

In block 350, subscribers may download the custom application into their own organization 362. In block 360, the license manager may monitor the LMA to view the installation information. Upon inspecting the LMA records, a local installation record may be displayed. Subsequent to blocks 310, 350 and 362, block 320 executes an application installation in a sequence of blocks, including creating a license administration user and a corresponding license object; sending an outbound message to a message server 342 with license information and a session identification; and making an API call to the subscriber to get the license manager organization 344 identification record, user and organization information upon receiving a message from the third party developer.

Some method embodiments include notifying a license manager to which the license manager application is installed of the installation of the application to the application platform includes creating, by a third party developer, block 330, a custom application and specifying the LMO when packaging the custom application, uploading, by the third party developer, the custom application into the application platform, and sending a message to the LMA so LMA can get package information for the custom application 320. In certain embodiments, managing subscriber access to the application using the license manager application includes downloading a custom application by a subscriber 350, and tracking a subscriber's install of the custom application by the LMA. In some embodiment, the method also includes notifying of a new version of a custom application being uploaded to the application services platform. In certain embodiments, the method also includes notifying of upgrading versions of a custom application to make available in the application services platform application exchange. In another embodiment, the method also includes notifying of uninstallation of a custom application to limit availability in the application services platform application exchange. An uninstallation can be implemented because the system keeps track of which metadata objects belong to the package through the package database schema.

In an embodiment of the method embodiment, once the custom application is installed, 350, the following are executed including creating a license administration user and a license object, sending an outbound message 340 to a message server 342, with license information and session identification. Upon receiving the message, message server 342 makes an API call to the subscriber to get the license manager organization identification, user and organization information 320. Next, message server then makes another API call to license manager (using the proxy user instance created when the LMA was installed in the license manager (a proxy user), to create a lead and a license copy in the license manager organization 320.

According to another embodiment, a method is provided for providing an association between a partner and a client creating a client specific instance of an application exchange directory which enables partners to determine which customers have installed particular versions of their application, when such use occurred and whether such use was in accordance with an agreed upon licensing agreement clicked through when the custom application version was installed 342, 360, 362. To implement the functionality under the current security framework, the entire license management process is supplemented with the additional steps including installing a tracking process 360 and, once a managed application is downloaded into an organization 350, providing an installation sequence 320 that will be executed.

In an embodiment of the system and method, the installation tracking process comprises a computer-readable medium of providing code to perform the steps of downloading a third party LMO into a third party organization, executing installation sequence steps in the license manager organization instance, creating a custom application in a partner developer organization by a third party developer and then specifying the LMO, uploading the custom application into the application exchange directory by a developer, sending an outbound message from the application exchange directory to the LMA such that the LMA can get the package information, downloading the custom application into the subscriber organization, executing the installation sequence, and tracking the subscriber's installation by an LMA.

According to another embodiment, a method is disclosed of providing an installation sequence 440. The method includes creating a license administration user and a license object 441, sending an outbound message to the message server with license object and session identification 442, upon receiving the message, making an API call to the subscriber by the message server and getting the user, subscriber organization identification record, and license management organization identification 443. In block 444, then making another API call to the publisher (using the proxy user created when the LMA was installed in the publisher) to create a license (install) record 441 in the LMO, message server then uses the proxy user information to create a package, lead, license copy in the proxy user organization instance.

Figure 4:
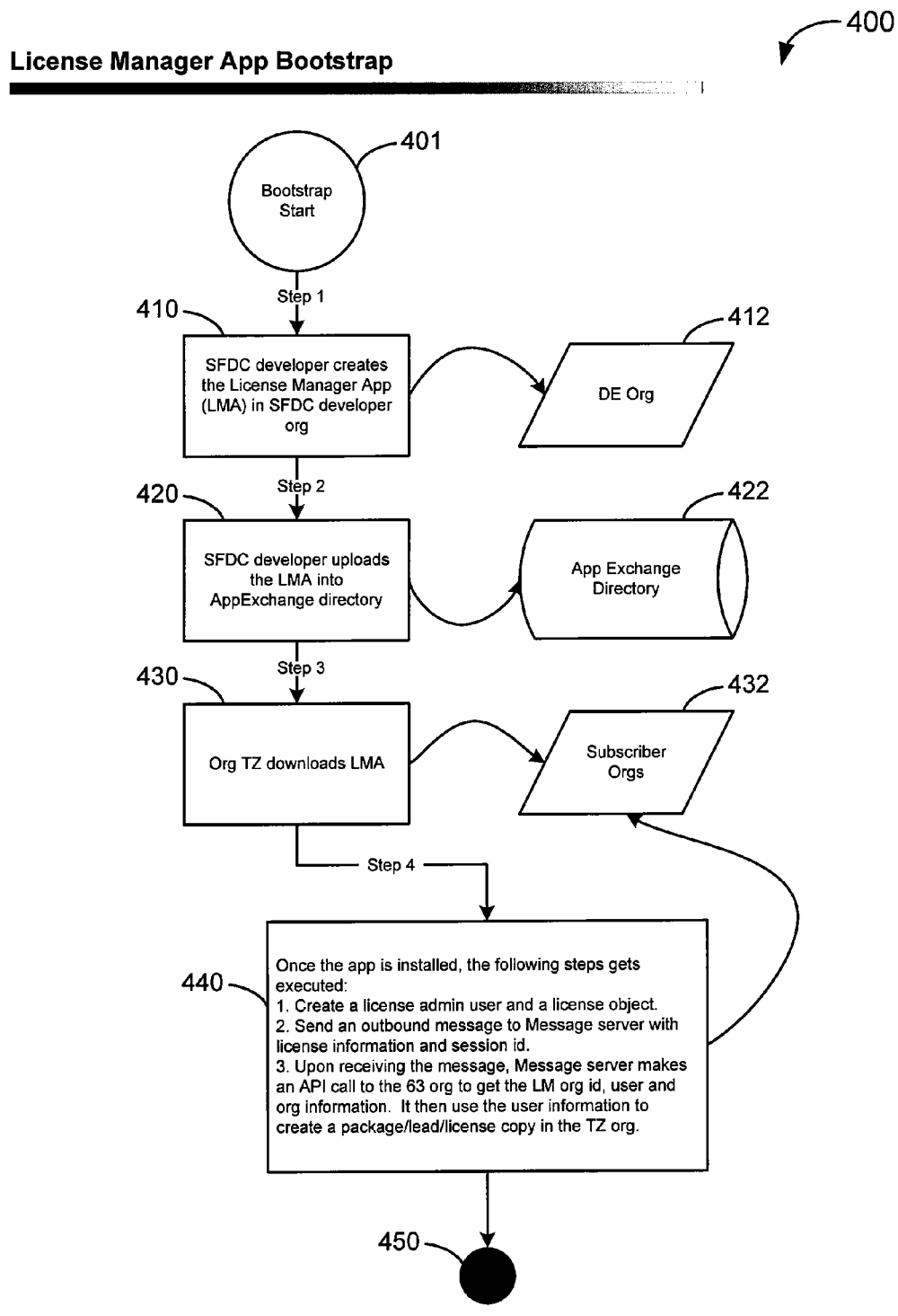
FIG. 4 illustrates an overview flow diagram of a license manager application bootstrap sequence embodiment.

According to an embodiment illustrated by FIG. 4, a method is disclosed for providing a bootstrap sequence 400. The method embodiment includes the steps to perform when a license management application is created to install into the LMO. The method includes creating the LMA in the host developer organization 412, specifying an associated license management organization with the LMA 410, making a check call to the organization to make sure that it has the LMA already installed, uploading the LMA into the application exchange directory 422 by the host developer 420, when an LMA is downloaded into the LMO 430, determining if the package exists by the subscriber organization 432, creating the package by a message server if one does not exist, downloading an LMA by the LMO, creating a package license in the LMO; and executing the installation sequence 440, as described above.

Figure 5:
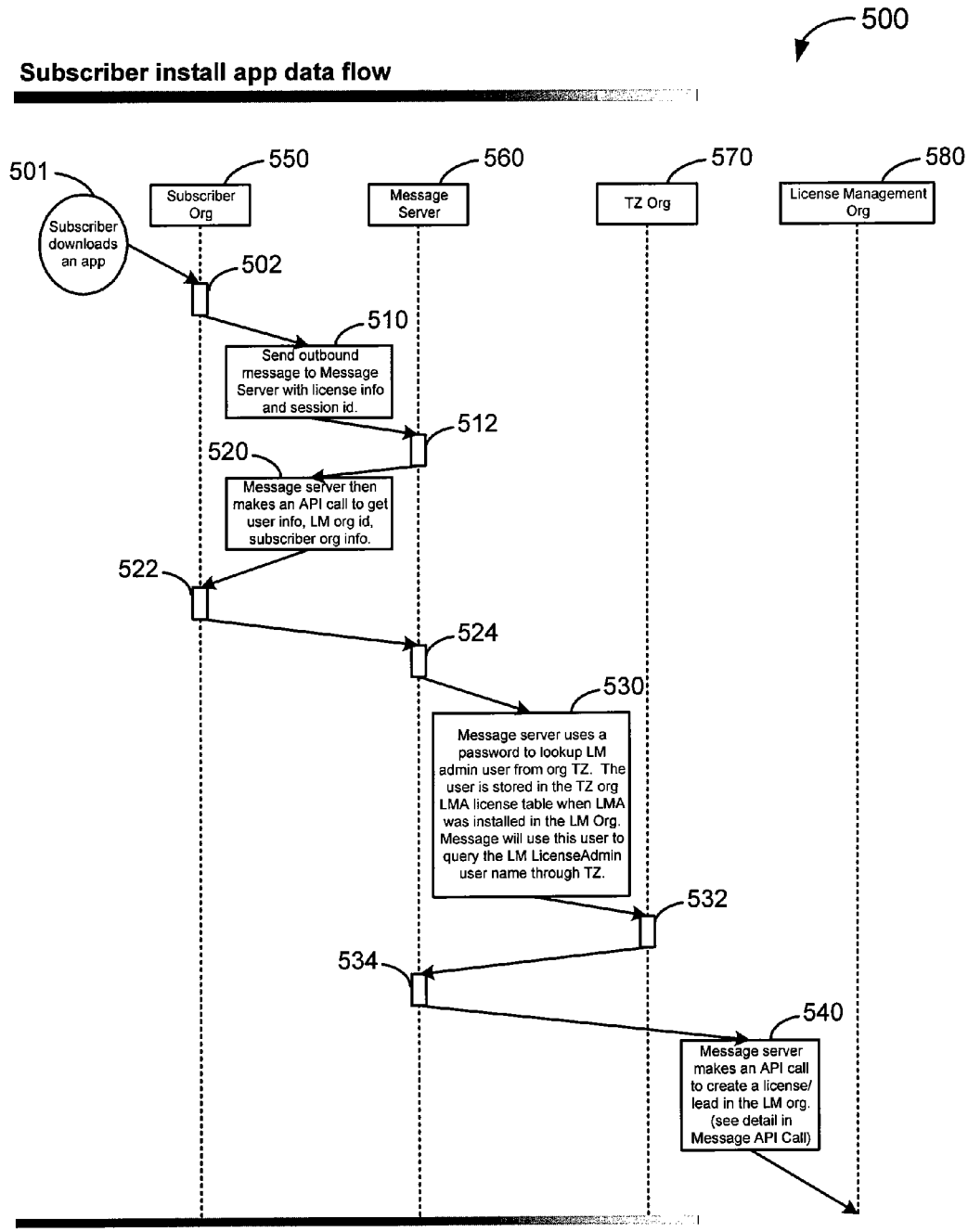
FIG. 5 illustrates a diagram of a subscriber install application data flow embodiment.

FIG. 5 illustrates a method 500 for installing an application at a subscriber organization in an embodiment. Method 500 illustrates a subscriber installation application data flow through a plurality of objects including the subscriber organization 550, the message server 560, the proxy user instance organization 570, and the LMO 580. Method 500 includes downloading an application 501 into the subscriber organization to create a user instance of the application 502 within the subscriber organization database object 550. The method includes providing a process for handling a case of a subscriber installation application data flow 500, including creating a license administration record when the LMO installs the LMA for the first time 501, wherein the license administration has not been replicated into the LMO itself. In block 510, the subscriber organization sends an outbound message to the message server with the subscriber instance license information and session identification record 512. In block 520, the message server then makes an API call to obtain user information license manager organization identification, and subscriber organization record information 522, thereby matching identical records in the publisher proxy user organization and subscriber organization to allow the message server to use the user name sent through the outbound message 524, and eliminating a lookup step, as described in block 530. In block 530, the message server uses a password to lookup the license manager administration proxy user from the proxy user instance organization. The proxy user information is stored in the proxy user instance organization LMA license table when the LMA was installed in the LMO. The message server then uses this user to query the license manager license administration user name 534 through the proxy user instance organization 532. Finally, the message server then makes an API call to create a license/lead in the license manager organization 540. A special case exists when the proxy user instance organization installs the LMA for the first time. The license administration record is created, but it has not been replicated into the proxy user instance organization 532. Therefore the message server cannot lookup the user name. But since the publisher organization and subscriber organization is the same in this case, the message server can then use the user name sent through the outbound message because there is no lookup needed.

Figure 6:
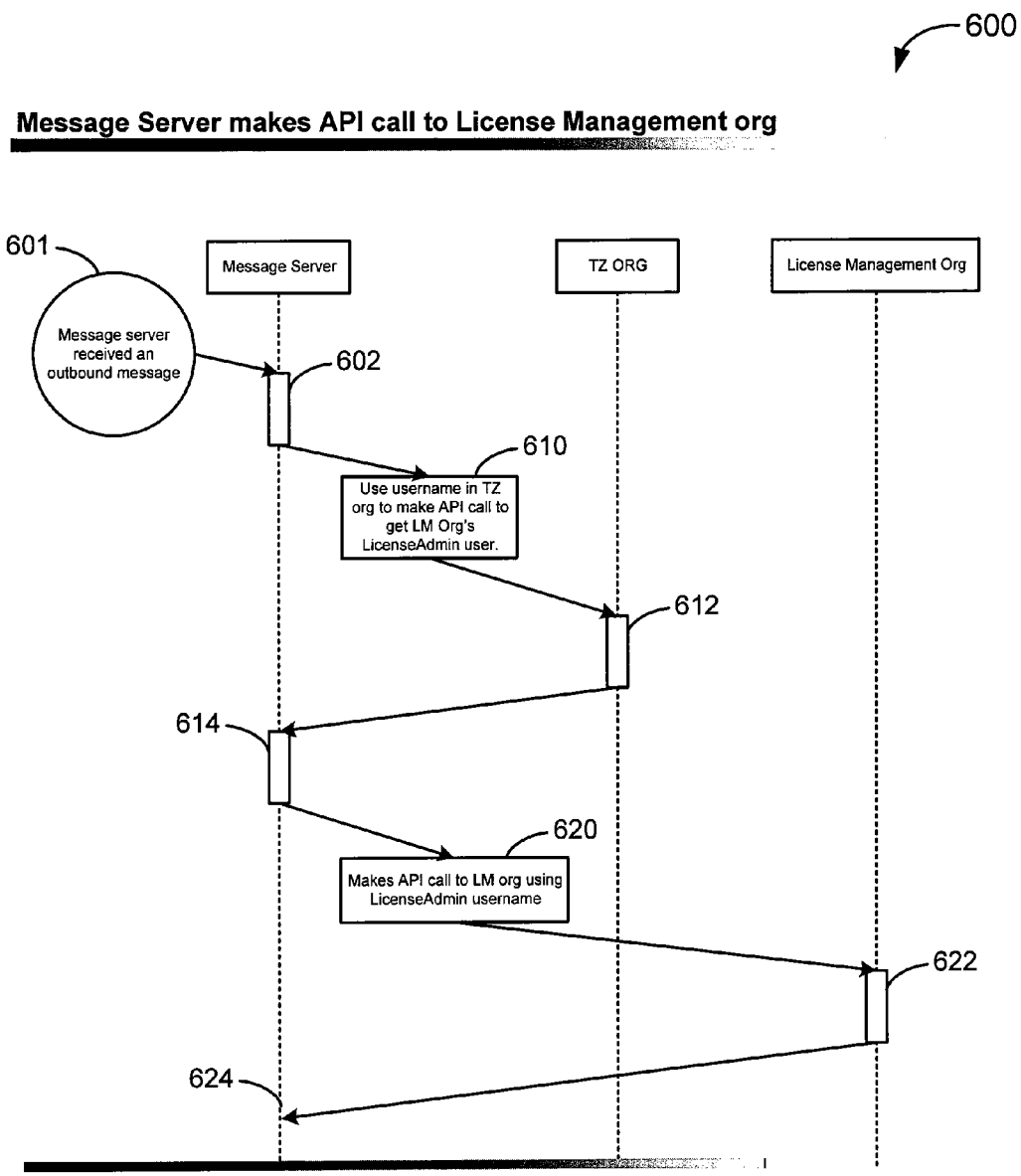
FIG. 6 illustrates a diagram of a message server API call to an LMO in an embodiment.

In another embodiment of the present invention as illustrated in FIG. 6, a method is described wherein the message server communicates with the LMO. The method 600 includes processing performed by the message server to make an API call to the license manager organization 620 using the license administration user name to return the record to the message server 624. The message server receives an outbound message 601 and then uses the username from the proxy user instance organization 610 to get the LMO's license administration user information record 610 and returns the record to the message server 614. Next, the message server makes an API call 620 to the LMO 622 using the license administration username 620 and upon obtaining the appropriate data from the LMO, returns the query information to the message server 624. When the message server does not have any user information about the user in the publisher's host organization, it cannot change data directly in publisher's organization. The proxy user instance organization has the publisher's license administration user information, however, because when the publisher installs the LMA, a user record is copied to the proxy user instance organization. A password to the proxy user instance organization will be hard coded into the message server to provide this login availability. Once the message server obtains the user information record, it can then login as the publisher and make changes as per the process outlined above.

In other embodiments as illustrated by FIGS. 7, 8 and 10, a package object and related fields 710, 810, and 1010 will be described in conjunction with the corresponding program code 720, 820, and 1020.

FIG. 7 illustrates various embodiments of a method to provide a package object 700. An example arrangement of fields including package name, package identification, developer name, developer organization identification, release date, latest version, and lead manager is illustrated in block 710. In block 720, an example Web Services Description Language (WSDL) rendering of a package object is illustrated.

FIG. 8 illustrates various embodiments of a method to provide a package version object 800. An example arrangement of fields including package version name, package, version, version identification, release date and sequence is illustrated in block 810. In block 820, an example WSDL rendering of a package version object is illustrated.

When a new package is first uploaded into the application exchange directory, the directory server must send an outbound message to the LMO so the message server can create the data record that corresponds with the new package. Subsequently, if a package is upgraded, the application exchange server will send another message so the LMA can get the changes as shown in method 900.

Figure 9:
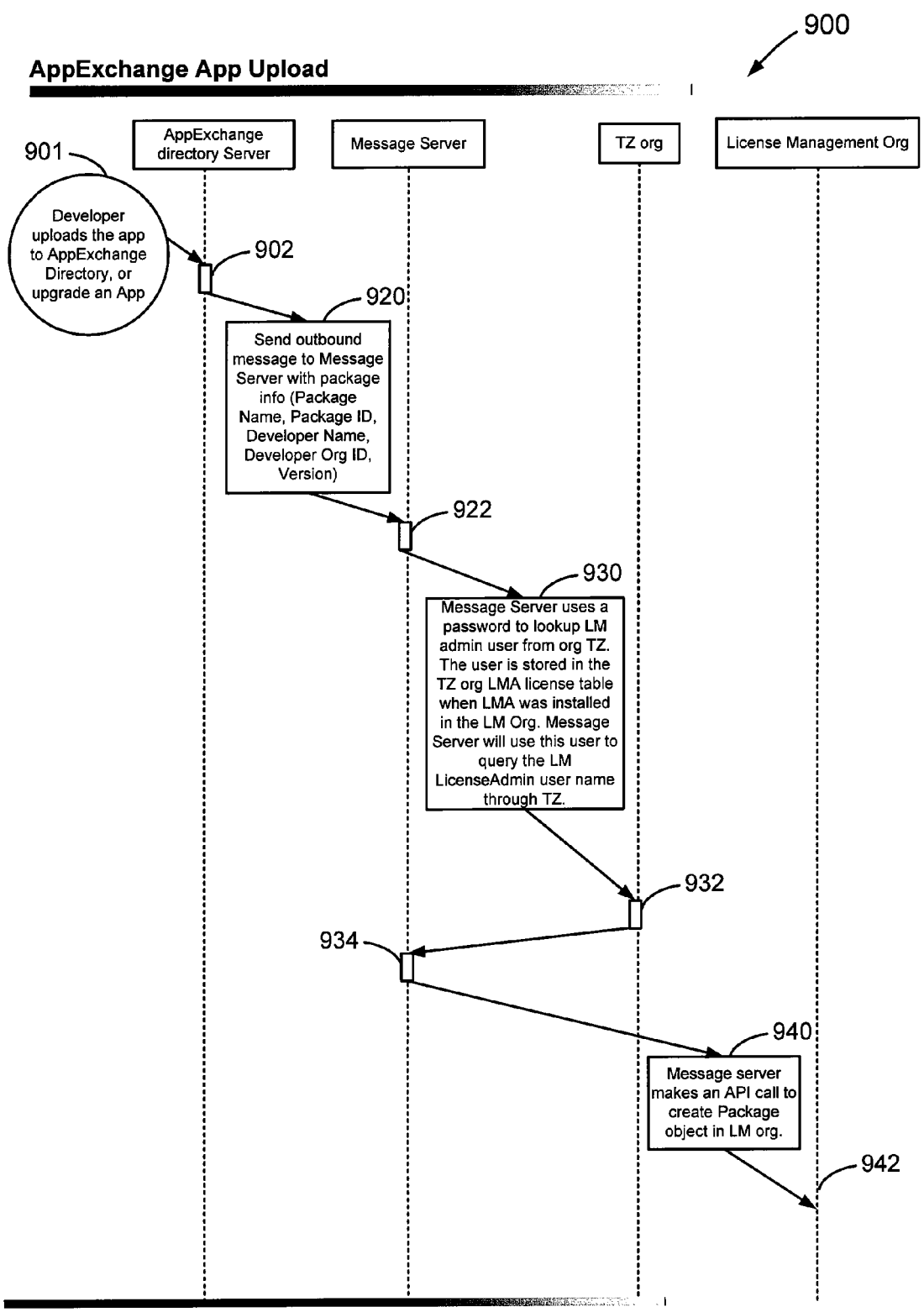
FIG. 9 illustrates a diagram of an application exchange upload sequence in an embodiment.

FIG. 9 illustrates an application exchange application upload method 900 in an embodiment. As shown by FIG. 9, a developer uploads the application to the application exchange directory, or uploads an upgrade to an application 901. The data is then collected into the application exchange directory 902 and the application exchange directory is replicated and the records are thereby updated to include the newly uploaded data. Next, the developer sends an outbound message to the message server with package information corresponding to the required fields including, in an example arrangement, package name, package identification, developer name, developer organization identification, and version 920. The data is then collected into the message server files 922 and the files are thereby replicated and updated. The message server then uses a password to lookup the license manager administration user from the organization corresponding to the proxy user instance 930. The user data is next stored in the proxy user instance organization LMA license table at the time when the LMA was installed in the LMO. The message server will then use the proxy user instance to query the license manager license administration user name through the proxy user instance 930. In block 932, the data is further replicated and updated into the proxy user instance of the organization LMA license table 932. The updated records from the updated table in the proxy user instance are then returned to the message server via a further replication 934. The message server makes an API call to create a new package object in the LMO. The LMO data is then replicated and updated in block 942.

FIG. 10 illustrates various embodiments of a method to provide a custom license object 1000. An exemplary arrangement of fields including license name, package version, lead, license status, installation date, number of seats, licensed seats, expiration, proxy user, account, and contact as illustrated in block 1010. In block 1020, an exemplary WSDL rendering of a license object is illustrated.

Figure 12:
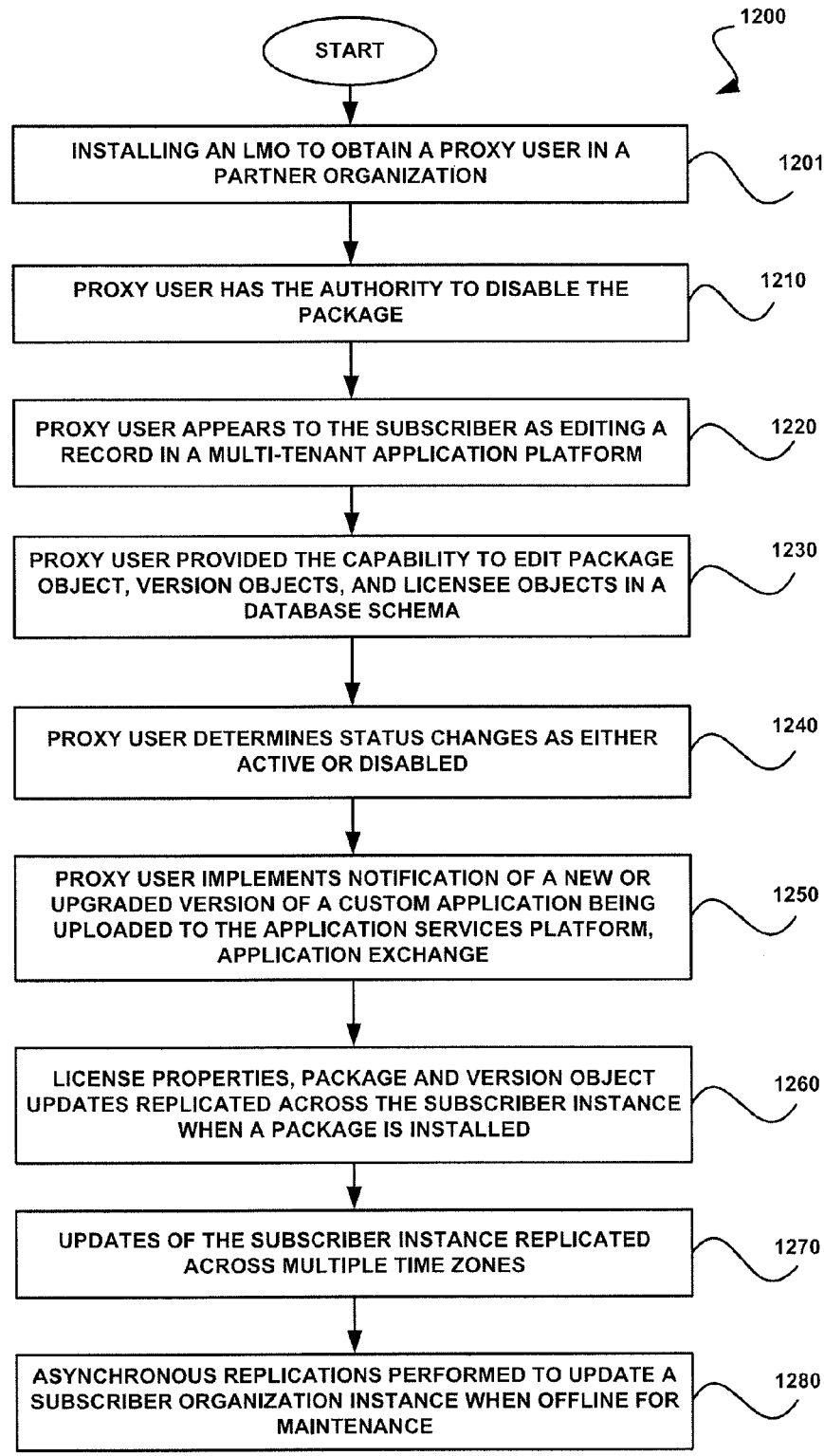
FIG. 12 illustrates an embodiment of various client interface configurations.

FIG. 12 illustrates a method for managing license objects to applications in a multiple tenant application platform 1200 in an embodiment. As shown by FIG. 12, the method includes installing an LMO to obtain a proxy user in a partner organization 1201. The proxy user has authority to disable the package 1210 and appears to the subscriber as editing a record in a multi-tenant application platform 1220. The proxy user may be provided the capability to edit package objects, version objects, and licensee objects in a database schema 1230. The proxy user determines status changes as either active or disabled 1240 and implements notification of a new or upgraded version of a custom application being uploaded to the application services platform, application exchange 1250. The licensee objects may include license properties, such as for example and without limitation, package version, license status, install date, the number of seats, formula for the number of seats, expiration date and formula, the proxy user, account and contact information. License properties, package and version object updates 1260 may be replicated across the subscriber instance of the multi-tenant application platform in the network when a package is installed. Updates of the subscriber instance associated with the multi-tenant application platform may be replicated across multiple time zones 1270. Further, asynchronous replications may be performed to update a subscriber organization instance when the subscriber organization instance is offline for maintenance 1280 or the like. A similar, analogous procedure is implemented to uninstall a package, upload a version update, or install a package upgrade.

U.S. patent application Ser. No. 11/530,394 filed Sep. 8, 2006, which claims priority from U.S. Provisional Patent Application No. 60/715,749, filed Sep. 9, 2005 which is incorporated by reference discloses additional aspects and embodiments regarding application package creation and exporting.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:
1. A method comprising:
  providing, by a system a platform shared by license managers, application developers, and subscribers;
  installing, to the system by one of the license managers, a license manager organization for the license manager, the license manager organization allowing the license manager to access applications associated therewith;

receiving, by the system from the license manager, a license manager application allowing the license manager to manage the applications associated with the license manager organization;

creating, through the system by one of the developers, an application;

receiving, by the system from the developer, a specification of the license manager organization for the application;

associating, in the system, the license manager organization with the application;

storing, by the system, the application in an application exchange directory of the system;

retrieving, within the system by the license manager application, package information for the application stored in the application exchange directory;

installing, through the system by one of the subscribers, the application from the application exchange directory to an organization of the subscriber within the system;

storing, by the system through the license manager application, a record of the installing of the application to the organization of the subscriber; and enabling the license manager to manage licensing properties of the application including access by the subscriber to the application using the license manager application.

2. The method of claim 1, further comprising:
in response to storing the application in the application exchange directory, sending a message to the license manager application so the license manager application can get the package information for the application.

3. The method of claim 1, wherein enabling the license manager to manage licensing properties of the custom application using the license manager application includes:
tracking the subscriber's installation of the application; and
enabling the license manager to specify at least a number of seats, a license status, or an expiration date of the installed application.

4. The method of claim 3, further comprising:
tracking, by the license manager application, the subscriber's upgrade of the application;
tracking, by the license manager application, the subscriber's uninstallation of the application such that a message is sent to the license manager organization and a license object status is changed to uninstalled; and
tracking the subscriber's version of the application installed to the subscriber organization.

5. The method of claim 1, further comprising:
notifying the license manager of a new version of the custom application being uploaded to the platform of the system; and
enabling the subscriber to update the application installed to the subscriber organization to the new version.

6. The method of claim 1, further comprising:
notifying the license manager of upgraded versions of the application.

7. The method of claim 1, wherein the application is an unmanaged package that cannot be upgraded.

8. A non-transitory computer readable medium containing program code executable by a processor in a computer for:
providing, by a system a platform shared by license managers, application developers, and subscribers;
installing, to the system by one of the license managers, a license manager organization for the license manager, the license manager organization allowing the license manager to access applications associated therewith;
receiving, by the system from the license manager, a license manager application allowing the license manager to manage the applications associated with the license manager organization;
creating, through the system by one of the developers, an application;
receiving, by the system from the developer, a specification of the license manager organization for the application;
associating, in the system, the license manager organization with the application;
storing, by the system, the application in an application exchange directory of the system;
retrieving, within the system by the license manager application, package information for the application stored in the application exchange directory;
installing, through the system by one of the subscribers, the application from the application exchange directory to an organization of the subscriber within the system;
storing, by the system through the license manager application, a record of the installing of the application to the organization of the subscriber; and
enabling the license manager to manage licensing properties of the application including access by the subscriber to the application using the license manager application.

9. The non-transitory computer readable medium of claim 8 wherein the program code is further executable by the processor in the computer for:
in response to storing the application in the application exchange directory, sending a message to the license manager application so the license manager application can get the package information for the application.

10. The non-transitory computer readable medium of claim 8 wherein the program code is further executable by the processor in the computer for:
tracking, by the license manager application, the subscriber's installation of the application; and
notifying the license manager of a new version of the application being uploaded to the platform of the on system; and
enabling the subscriber to download or update the application installed to the subscriber organization to the new version.

* * * * *